US012580689B2

(12) United States Patent
Fu et al.

(10) Patent No.: US 12,580,689 B2
(45) Date of Patent: Mar. 17, 2026

(54) WIRELESS COMMUNICATION METHOD, TERMINAL DEVICE AND NETWORK DEVICE

(71) Applicant: GUANGDONG OPPO MOBILE TELECOMMUNICATIONS CORP., LTD., Dongguan (CN)

(72) Inventors: Zhe Fu, Dongguan (CN); Zuomin Wu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 315 days.

(21) Appl. No.: 18/085,568

(22) Filed: Dec. 20, 2022

(65) Prior Publication Data

US 2023/0198678 A1     Jun. 22, 2023

Related U.S. Application Data

(63) Continuation of application No. PCT/CN2020/123424, filed on Oct. 23, 2020.

(51) Int. Cl.
*H04L 1/18* (2023.01)
*H04L 1/1812* (2023.01)
(Continued)

(52) U.S. Cl.
CPC ....... *H04L 1/1812* (2013.01); *H04W 72/1263* (2013.01); *H04W 72/543* (2023.01); *H04W 72/56* (2023.01)

(58) Field of Classification Search
CPC ... H04L 1/1812; H04L 1/1822; H04L 1/1864; H04L 1/1887; H04L 1/1893;
(Continued)

(56) References Cited

U.S. PATENT DOCUMENTS

| 12,294,465 B2* | 5/2025 | Kuo | ........................ | H04L 1/188 |
| 2020/0154469 A1* | 5/2020 | Chin | ..................... | H04W 72/56 |

(Continued)

FOREIGN PATENT DOCUMENTS

| CN | 104796238 A | 7/2015 |
| CN | 110557835 A | 12/2019 |
| CN | 110637432 A | 12/2019 |
| CN | 111432440 A | 7/2020 |
| CN | 111565460 A | 8/2020 |
| CN | 111699713 A | 9/2020 |

(Continued)

OTHER PUBLICATIONS

International Search Report issued in International application No. PCT/CN2020/123424, mailed Jul. 2, 2021, 4 pages.
(Continued)

*Primary Examiner* — Phuc H Tran
(74) *Attorney, Agent, or Firm* — BAYES PLLC

(57) ABSTRACT
Provided in embodiments of the present disclosure are a wireless communication method, a terminal device, and a network device. Said method comprises: a terminal device selects, according to a HARQ process selection rule, a first HARQ process among a plurality of HARQ processes corresponding to a CG resource, and transmits data on the first HARQ process by means of the CG resource. A HARQ process can thereby be selected when there are a plurality of usable HARQ processes corresponding to a CG resource.

17 Claims, 3 Drawing Sheets

(51) Int. Cl.
*H04W 72/1263* (2023.01)
*H04W 72/543* (2023.01)
*H04W 72/56* (2023.01)

(58) Field of Classification Search
CPC ............ H04L 5/0055; H04W 72/1263; H04W
72/543; H04W 72/56
See application file for complete search history.

(56) References Cited

U.S. PATENT DOCUMENTS

| | | | | | |
|---|---|---|---|---|---|
| 2020/0351031 | A1* | 11/2020 | Wu | ....................... | H04L 1/1883 |
| 2022/0116987 | A1* | 4/2022 | Chin | ................. | H04W 72/1268 |
| 2022/0294572 | A1* | 9/2022 | Wu | ....................... | H04L 1/1812 |
| 2024/0080877 | A1* | 3/2024 | Lee | ......................... | H04L 5/005 |
| 2024/0089982 | A1* | 3/2024 | Lee | ..................... | H04W 72/232 |

FOREIGN PATENT DOCUMENTS

| | | |
|---|---|---|
| WO | 2019246285 A1 | 12/2019 |
| WO | 2020034223 A1 | 2/2020 |
| WO | 2020164013 A1 | 8/2020 |

OTHER PUBLICATIONS

Written Opinion of the International Searching Authority issued in International application No. PCT/CN2020/123424, mailed Jul. 2, 2021, 8 pages.

3GPP TS 38.321 V16.2.1 (Sep. 2020), 3rd Generation Partnership Project; Technical Specification Group Radio Access Network; NR; Medium Access Control (MAC) protocol specification (Release 16), 153 pages.
3GPP TSG-RAN WG2 Meeting #111-e, R2-2006923, Online, Aug. 17-28, 2020, "Configured Grant Enhancement Harmonization for NR-U and URLLC", Agenda item: 8.5.3, Source: Nokia, Nokia Shanghai Bell, 5 pages.
3GPP TR 38.889 V16.0.0 (Dec. 2018), "3rd Generation Partnership Project; Technical Specification Group Radio Access Network; Study on NR-based access to unlicensed spectrum (Release 16)", 119 pages.
Notice of Priority Examination of Patent Application issued in corresponding Chinese Application No. 202080104865.6, mailed Sep. 19, 2024, 6 pages.
Communication pursuant to Article 94(3) EPC issued in corresponding European Application No. 20958365.7, mailed Sep. 26, 2024, 4 pages.
First Office Opinion Notice issued in corresponding Chinese Application No. 202080104865.6, mailed Oct. 11, 2024, 20 pages.
Extended European Search Report issued in corresponding European application No. 20958365.7, mailed Nov. 10, 2023.
Source: Ericsson; Title: Harmonizing UL CG enhancements in NR-U and URLLC 3GPP TSG-RAN WG2 #112-e TDoc R2-2008881 Electronic, Nov. 2-13, 2020.
Second Office action issued in corresponding Chinese Application No. 202080104865.6, mailed Dec. 17, 2024, 18 pages.
Second Office Action issued in corresponding European Application No. 20958365.7, mailed Mar. 31, 2025, 7 pages.

* cited by examiner

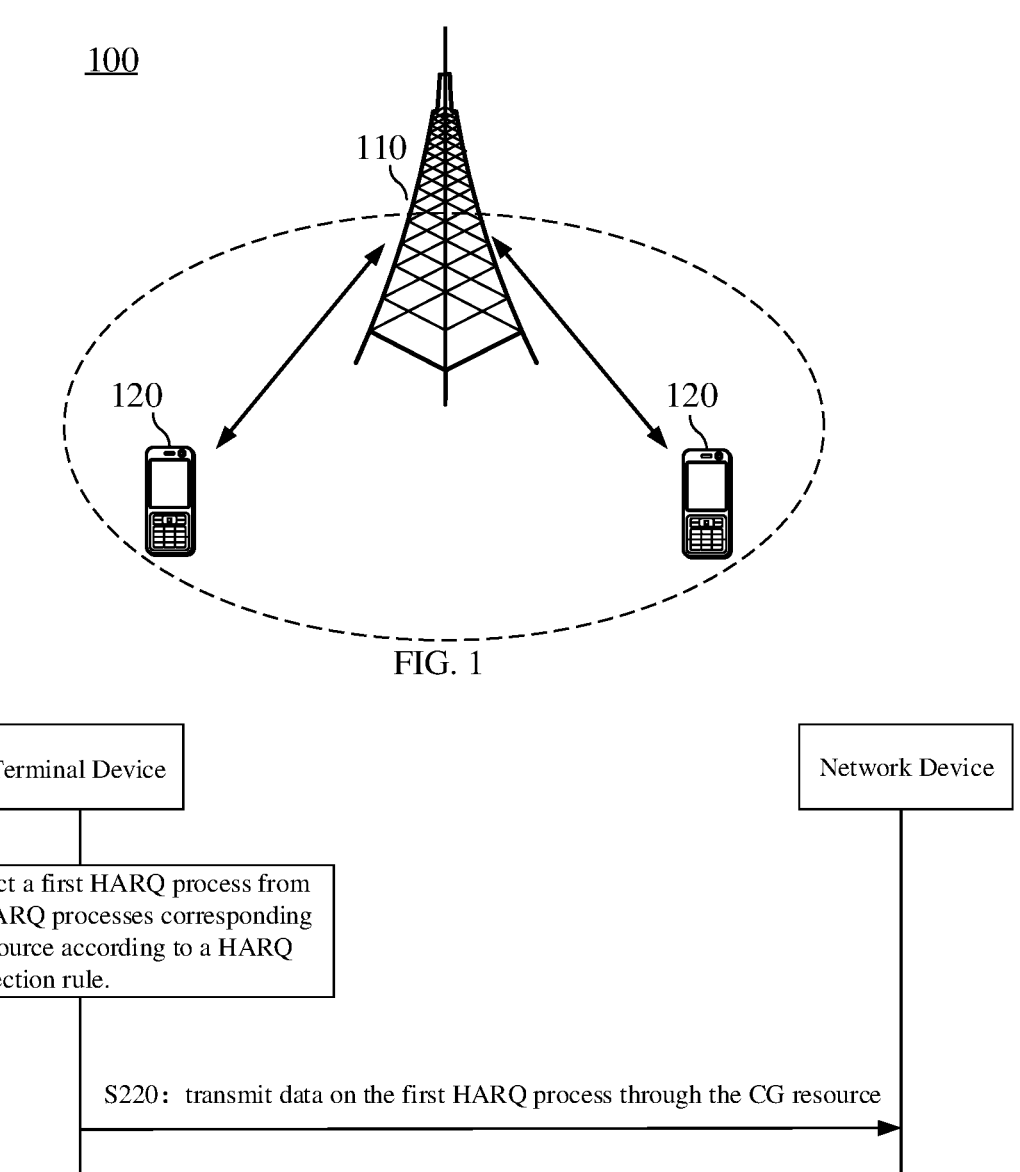
100
110
120          120
FIG. 1
Terminal Device
Network Device
S210: Select a first HARQ process from multiple HARQ processes corresponding to a CG resource according to a HARQ process selection rule.
S220: transmit data on the first HARQ process through the CG resource
FIG. 2
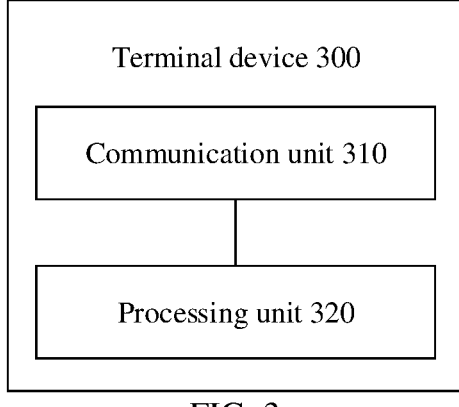
Terminal device 300
Communication unit 310
Processing unit 320
FIG. 3

Network device 400

Communication unit 410

Processing unit 420

Terminal device 500

Processing unit 510

Terminal device 600

Processing unit 610

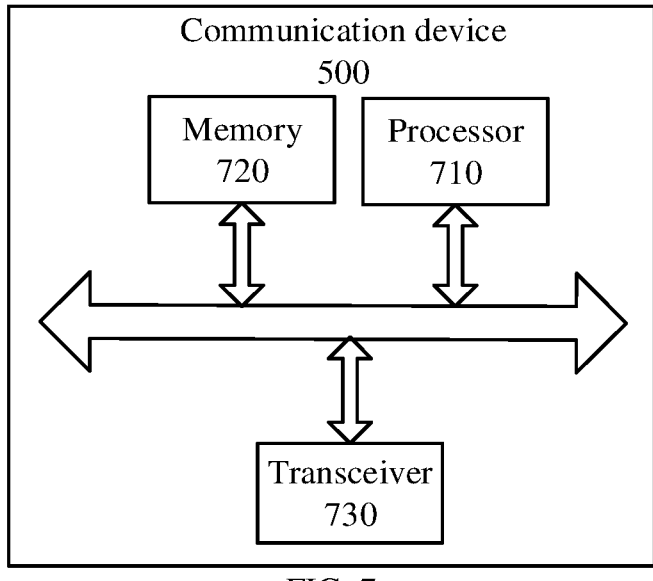
FIG. 7
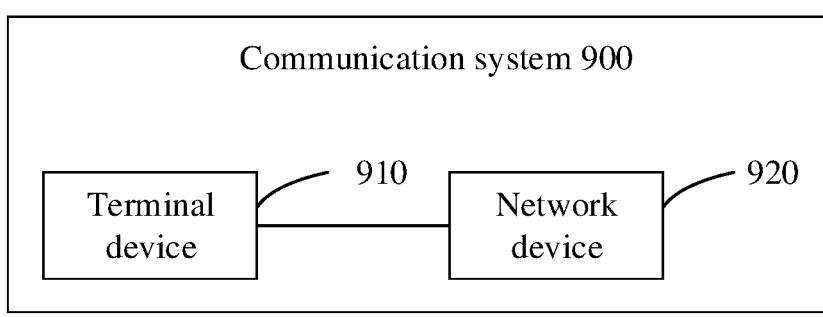
FIG. 8
FIG. 9

WIRELESS COMMUNICATION METHOD, TERMINAL DEVICE AND NETWORK DEVICE

CROSS-REFERENCE

This application is a continuation application of PCT Patent Application No. PCT/CN2020/123424, entitled "WIRELESS COMMUNICATION METHOD, TERMINAL DEVICE AND NETWORK DEVICE" filed on Oct. 23, 2020, the disclosure of which is incorporated herein by reference in its entirety.

TECHNICAL FIELD

The embodiments of the present disclosure relate to the communication field, and more specifically, relate to a wireless communication method, a terminal device, and a network device.

BACKGROUND

In New Radio Unlicensed (NRU) Configured Grant (CG) enhancement schemes, for flexible selection of resources, a HARQ process of a NRU CG resource is not calculated according to formulas, but is selected by a terminal device itself. That is, for a CG resource, a network device configures a set of HARQ processes for the CG resource via Radio Resource Control (RRC) signaling, and the terminal device can select a HARQ process for current CG transmission from the set. How to select the HARQ process and perform data transmission is a technical problem to be solved urgently in the present disclosure.

SUMMARY

The embodiments of the present disclosure provides a wireless communication method, a terminal device and a network device, so that a HARQ process can be selected when a CG resource corresponds to multiple available HARQ processes.

In a first aspect, a wireless communication method is provided, including: selecting, by a terminal device according to a HARQ process selection rule, a first HARQ process from multiple HARQ processes corresponding to a CG resource, and transmitting, by the terminal device, data on the first HARQ process through the CG resource.

In a second aspect, a wireless communication method is provided, including: sending, by a network device, first indication information to a terminal device; wherein the first indication information is used to indicate to select a HARQ process according to a HARQ process selection rule.

In a third aspect, a wireless communication method is provided, including: starting, by a terminal device, at least one of a CG timer and a CG retransmission timer at a first time, or restarting, by the terminal device, at least one of the CG timer and the CG retransmission timer at the first time.

Optionally, starting, by the terminal device, the at least one of the CG timer and the CG retransmission timer at the first time includes: starting, by the terminal device, the at least one of the CG timer and the CG retransmission timer at the first time, when a second condition is met.

Optionally, restarting, by the terminal device, the at least one of the CG timer and the CG retransmission timer at the first time includes: restarting, by the terminal device, the at least one of the CG timer and the CG retransmission timer at the first time, when a second condition is met.

Optionally, the second condition includes at least one of the following:

a priority of a resource for the terminal device is lower than or equal to priorities of other resources;

a CG resource corresponding to the terminal device conflicts with other resources;

a MAC PDU corresponding to the CG resource cannot be transmitted;

a priority of the MAC PDU corresponding to the CG resource is lower than or equal to priorities of other MAC PDUs;

data corresponding to the CG resource is not transmitted;

data corresponding to the CG resource is not transmitted by a physical layer;

data transmission corresponding to the CG resource is canceled;

data transmission corresponding to the CG resource is not performed;

transmission corresponding to the CG resource is canceled;

transmission corresponding to the CG resource is not performed;

the terminal device is configured with an autonomous transmission parameter;

a CG retransmission timer is not configured;

a CG retransmission timer is not running;

the HARQ process corresponding to the CG resource is pending;

no CG retransmission timer is configured, and the resource (or PUSCH) corresponds to a CG resource with a low priority;

a CG retransmission timer is configured, and the HARQ process corresponding to the CG resource is pending;

a CG retransmission timer is configured, and the HARQ process corresponding to the CG resource is not pending, the transmission is not performed, and the terminal device is configured with an autonomous transmission parameter;

a CG retransmission timer is configured, and the HARQ process corresponding to the CG resource is not pending, and the terminal device is configured with an autonomous transmission parameter;

a CG retransmission timer is configured, and the HARQ process corresponding to the CG resource is not pending;

the resource (or PUSCH) corresponds to a CG resource with a low priority;

the HARQ process corresponding to the CG resource is not pending;

the HARQ process corresponding to the CG resource is pending;

the HARQ process corresponding to the CG resource is not pending, and an autonomous transmission parameter is configured; and the HARQ process corresponding to the CG resource is not pending, the transmission is not performed, and an autonomous transmission parameter is configured.

Optionally, the method further includes making, by the terminal device, the HARQ process corresponding to the CG resource be pending and/or determining, by the terminal device, that data corresponding to the CG resource is transmitted, if the terminal device meets a third condition and any one of the following: the terminal device is not configured with an autonomous transmission parameter, the terminal device is not configured with the autonomous transmission parameter and is configured to perform resource selection based on a LCH priority, and the terminal device uses NRU autonomous retransmission.

Optionally, the method further includes making, by the terminal device, the HARQ process corresponding to the CG resource be pending and/or determining, by the terminal device, that data corresponding to the CG resource is not transmitted, if the terminal device meets a third condition and any one of the following: the terminal device is not configured with an autonomous transmission parameter, the terminal device is not configured with the autonomous transmission parameter and is configured to perform resource selection based on a LCH priority, or the terminal device uses NRU autonomous retransmission.

Optionally, the method further includes making, by the terminal device, the HARQ process corresponding to the CG resource be not pending and/or determining, by the terminal device, that data corresponding to the CG resource is not transmitted, if the terminal device meets a third condition and any one of the following: the terminal device is configured with an autonomous transmission parameter, the terminal device is configured with the autonomous transmission parameter and is configured to perform resource selection based on a LCH priority, or the terminal device uses URLLC autonomous transmission.

Optionally, the third condition includes at least one of the following:

a priority of the resource corresponding to the HARQ process in previous data transmission is lower than or equal to priorities of other resources;

a MAC PDU corresponding to the HARQ process cannot be transmitted;

a priority of the MAC PDU corresponding to the HARQ process is lower than or equal to priorities of other MAC PDUs;

data corresponding to the HARQ process is not transmitted;

data transmission corresponding to the HARQ process is canceled;

data of the terminal device is not transmitted;

data transmission of the terminal device is canceled;

data transmission corresponding to the CG resource is not performed;

transmission corresponding to the CG resource is canceled;

transmission corresponding to the CG resource is not performed;

no LBT failure indication is received;

the resource of the terminal device has a priority lower than or equal to priorities of resources of other terminal devices; and a CG retransmission timer is not running.

Optionally, the first time is later than or the same as an end time of a last time-domain symbol of the CG resource.

In a fourth aspect, a wireless communication method is provided, including: stopping, by a terminal device, at least one of a CG timer and a CG retransmission timer when a second condition is met.

Optionally, stopping, by the terminal device, the at least one of the CG timer and the CG retransmission timer when the second condition is met includes: if at least one of the CG timer and the CG retransmission timer is running, stopping, by the terminal device, the at least one of the CG timer and the CG retransmission timer when the second condition is met.

Optionally, the second condition includes at least one of the following:

a priority of a resource for the terminal device is lower than or equal to priorities of other resources;

a CG resource corresponding to the terminal device conflicts with other resources;

a MAC PDU corresponding to the CG resource cannot be transmitted;

a priority of the MAC PDU corresponding to the CG resource is lower than or equal to priorities of other MAC PDUs;

data corresponding to the CG resource is not transmitted;

data corresponding to the CG resource is not transmitted by a physical layer;

data transmission corresponding to the CG resource is canceled;

data transmission corresponding to the CG resource is not performed;

transmission corresponding to the CG resource is canceled;

transmission corresponding to the CG resource is not performed;

the terminal device is configured with an autonomous transmission parameter;

a CG retransmission timer is not configured;

a CG retransmission timer is not running;

the HARQ process corresponding to the CG resource is pending;

a CG retransmission timer is not configured, and the resource (or PUSCH) corresponds to a CG resource with a low priority;

a CG retransmission timer is configured, and the HARQ process corresponding to the CG resource is pending;

the CG retransmission timer is configured, and the HARQ process corresponding to the CG resource is not pending, the transmission is not performed, and the terminal device is configured with an autonomous transmission parameter;

the CG retransmission timer is configured, and the HARQ process corresponding to the CG resource is not pending, and the terminal device is configured with an autonomous transmission parameter;

a CG retransmission timer is configured, and the HARQ process corresponding to the CG resource is not pending;

the resource (or PUSCH) corresponds to a CG resource with a low priority;

the HARQ process corresponding to the CG resource is not pending;

the HARQ process corresponding to the CG resource is pending;

the HARQ process corresponding to the CG resource is not pending, and an autonomous transmission parameter is configured; and the HARQ process corresponding to the CG resource is not pending, the transmission is not performed, and an autonomous transmission parameter is configured.

Optionally, the method further includes making, by the terminal device, the HARQ process corresponding to the CG resource be pending and/or determining, by the terminal device, that data corresponding to the CG resource is transmitted, if the terminal device meets a third condition and any one of the following: the terminal device is not configured with an autonomous transmission parameter, the terminal device is not configured with the autonomous transmission parameter and is configured to perform resource selection based on a LCH priority, and the terminal device uses NRU autonomous retransmission.

Optionally, the method further includes making, by the terminal device, the HARQ process corresponding to the CG resource be pending and/or determining, by the terminal device, that data corresponding to the CG resource is not transmitted, if the terminal device meets a third condition and any of the following: the terminal device is not configured with an autonomous transmission parameter, the terminal device is not configured with the autonomous transmission parameter and is configured to perform resource selection based on a LCH priority, or the terminal device uses NRU autonomous retransmission.

Optionally, the method further includes making, by the terminal device, the HARQ process corresponding to the CG resource be not pending and/or determining, by the terminal device, that data corresponding to the CG resource is not transmitted, if the terminal device meets a third condition and any of the following: the terminal device is configured with an autonomous transmission parameter, the terminal device is configured with an autonomous transmission parameter and is configured to perform resource selection based on a LCH priority, or the terminal device uses URLLC autonomous transmission.

Optionally, the third condition includes at least one of the following:

a priority of the resource corresponding to the HARQ process in previous data transmission is lower than or equal to priorities of other resources;

a MAC PDU corresponding to the HARQ process cannot be transmitted;

a priority of the MAC PDU corresponding to the HARQ process is lower than or equal to priorities of other MAC PDUs;

data corresponding to the HARQ process is not transmitted;

data transmission corresponding to the HARQ process is canceled;

data of the terminal device is not transmitted;

data transmission of the terminal device is canceled;

data transmission corresponding to the CG resource is not performed;

transmission corresponding to the CG resource is canceled;

transmission corresponding to the CG resource is not performed;

no LBT failure indication is received;

the resource of the terminal device has a priority lower than or equal to priorities of resources of other terminal devices; and a CG retransmission timer is not running.

In a fifth aspect, a terminal device is provided, including: a communication unit and a processing unit; the processing unit is configured to select a first HARQ process from multiple HARQ processes corresponding to a CG resource according to a HARQ process selection rule; and the communication unit is configured to transmit data on the first HARQ process through the CG resource.

In a sixth aspect, a network device is provided, including: a communication unit, configured to send first indication information to a terminal device; where the first indication information is used to indicate to select a HARQ process according to a HARQ process selection rule.

In a seventh aspect, a terminal device is provided, and the terminal device includes: a processing unit configured to start or restart a CG timer and/or a CG retransmission timer at a first time.

In an eighth aspect, a terminal device is provided, and the terminal device includes: a processing unit configured to stop a CG timer and/or a CG retransmission timer when a second condition is met.

In a ninth aspect, there is provided an apparatus configured to carry out the method in any one of the above first to fourth aspects or the implementations thereof.

Specifically, the apparatus includes a processor configured to call and run a computer program from a memory, to cause a device installed with the apparatus to perform the method in any one of the above first to fourth aspects or the implementations thereof.

In a tenth aspect, there is provided a computer-readable storage medium configured to store a computer program that causes a computer to perform the method in any one of the foregoing first to fourth aspects or the implementations thereof.

In an eleventh aspect, there is provided a computer program product including computer program instructions that cause a computer to perform the method in any one of the foregoing first to fourth aspects or the implementations thereof.

In a twelfth aspect, there is provided a computer program which, when running on a computer, causes the computer to perform the method in any one of the above first to fourth aspects or the implementations thereof.

BRIEF DESCRIPTION OF THE DRAWINGS

FIG. 1 is a schematic structural diagram of a communication system provided by an embodiment of the present disclosure;

FIG. 2 is an interaction flowchart of a wireless communication method provided by an embodiment of the present disclosure;

FIG. 3 shows a schematic block diagram of a terminal device 300 according to an embodiment of the present disclosure;

FIG. 7 is a schematic structural diagram of a communication device 700 provided by an embodiment of the present disclosure;

FIG. 8 is a schematic structural diagram of an apparatus according to an embodiment of the present disclosure;

FIG. 9 is a schematic block diagram of a communication system 900 according to an embodiment of the present disclosure.

DETAILED DESCRIPTION

Figures 4, 5, 6:
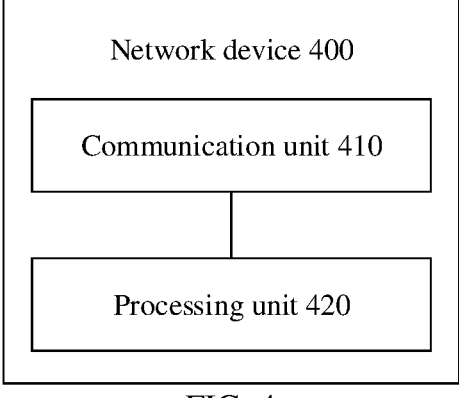
FIG. 4 shows a schematic block diagram of a network device 400 according to an embodiment of the present disclosure.
FIG. 5 shows a schematic block diagram of a terminal device 500 according to an embodiment of the present disclosure.
FIG. 6 shows a schematic block diagram of a terminal device 600 according to an embodiment of the present disclosure.

The technical solutions in the embodiments of the present disclosure will be described below in connection with the drawings in the embodiments of the present disclosure. Obviously, the embodiments described are part of the embodiments of the present disclosure, but not all the embodiments. All other embodiments obtained by those of ordinary skill in the art based on the embodiments in the present disclosure without creative work fall within the protection scope of the present disclosure.

In order to better understand the embodiments of the present disclosure, the context related to NRU and the CG enhancements in the NRU are firstly explained below.

CG Enhancements in URLLC:

(1) In order to support high latency requirements of URLLC services, a CG cycle is enhanced for the URLLC services, that is, any service cycle of slot-level is supported.

(2) In order to support multiple URLLC service scenarios and high latency requirements of the URLLC services, multiple CG configurations are introduced for the URLLC, which are CG resources here. Different CGs are configured with different HARQ processes, where a parameter harq-ProcID-Offset2 can be used to ensure that the HARQ processes configured for different CGs are different.

(3) Since there may be conflict between the CG resource and other resources, in order to ensure that Media Access Control Element (MAC) Protocol Data Units (PDUs) that have been packeted in the CG resource are not discarded or are to be transmitted as soon as possible, autonomous transmission for the CG resource (i.e. data on the CG resource) is introduced. For a CG resource in which the MAC PDUs have been packeted and which cannot be transmitted due to resource conflict, a subsequent CG resource of the same HARQ process and having the same CG configuration as the CG resource can be used for autonomous transmission of the data. It can be determined to use the autonomous transmission from the autonomous transmission parameter autonomousTx.

NRU-related context:

NRU includes the following working scenarios.

Scenario A: a carrier aggregation scenario, where a Primary Cell (PCell) corresponds to the licensed spectrum, and a Secondary Cell (SCell) corresponds to the NRU.

Scenario B: a dual connectivity working scenario, where a PCell corresponds to LTE licensed spectrum, and a Primary Secondary Cell (PScell) corresponds to the NRU.

of the NRU on systems that have already deployed on the unlicensed spectrum (such as Wi-Fi) cannot exceed the impact between these systems.

To ensure fair coexistence between systems on the unlicensed spectrum, energy detection has been agreed as a fundamental coexistence mechanism. The general energy detection mechanism is a Listen Before Talk (LBT) mechanism. The basic principle of this mechanism is: before the network device or terminal device as a transmitting end transmits data on the unlicensed spectrum, it needs to listen for a period of time according to the rules. If the result of the listening indicates that the channel is idle, the transmitting end can transmit data to the receiving end. If the result of the listening indicates that the channel is occupied, the transmitting end needs to back off for a period of time according to the rules and then continue listening to the channel, and cannot transmit data to the receiving end until the result of the channel listen is idle.

CG Enhancements in NRU:

(1) For flexible selection of the resource, the HARQ process of the NRU CG is not calculated according to the formulas, but is selected by the terminal device itself. For a CG resource, the network device configures a set of HARQ processes for the CG resource via RRC signaling, and the terminal device can select a HARQ process for current CG transmission from the set. The set of HARQ processes can be determined by parameters of harq-ProcID-Offset and nrofHARQ-Processes.

(2) Multiple CG configurations are introduced for the NRU, where the multiple CG configurations can share a HARQ process.

(3) A CG retransmission timer (cg-Retransmission Timer) is introduced to support data transmission triggered when the CG resource cannot be transmitted due to LBT failure. After the cg-RetransmissionTimer expires, if the CG timer (Configured Grant Timer) does not expire, the corresponding HARQ process or data on the CG resource can be transmitted.

The data transmission on the CG resource can be interrupted by dynamic scheduling DCI and DFI, which are specifically as shown in Table 1:

TABLE 1

|  | DFI = ACK | DFI = NACK | DCI = new tx (i.e., DCI indicates new transmission of data) | DCI = retx (i.e., DCI indicates data retransmission) | CG timer expires |
|---|---|---|---|---|---|
| CG retransmission timer | Stop | No impact, i.e. continue timing | Start or restart | Start or restart | None |
| CG timer | Stop | Stop | Stop | Stop | Stop |

Scenario C: a standalone working scenario, a standalone cell works on the NRU.

Scenario D: a NR single-cell scenario, where Uplink (UL) works on the licensed spectrum, and Downlink (DL) works on the NRU.

Scenario E: a dual connectivity working scenario, where a PCell corresponds to NR licensed spectrum, and a PScell corresponds to the NRU.

Generally, a working frequency band of the NRU is 5 GHz unlicensed spectrum and 6 GHz unlicensed spectrum. On the unlicensed spectrum, the design of the NRU should ensure fairness with other systems that have already worked on these unlicensed spectrum, such as Wireless Fidelity (Wi-Fi) and so on. The principle of fairness is that the impact As mentioned above, when one CG resource corresponds to multiple available HARQ processes, how to select a HARQ process among the multiple HARQ processes and perform data transmission is a technical problem to be solved urgently in present disclosure.

In order to solve the above technical problem, the present disclosure proposes that the terminal device selects a HARQ process among multiple HARQ processes according to a HARQ process selection rule for data transmission.

It should be noted that the technical solution of the present disclosure is not only applicable to the NRU system, the embodiments of the present disclosure can also be applied to various communication systems, such as a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, an Advanced long term evolution (LTE-A) system, a NR system, an evolution system of NR system, a LTE-based access to unlicensed spectrum (LTE-U) system, a Universal Mobile Telecommunication System (UMTS), a Wireless Local Area Network (WLAN), a Wi-Fi, a next generation communication system or other communication systems, etc.

Generally speaking, traditional communication systems support a limited number of connections and are easy to implement. However, with the development of communication technologies, mobile communication systems will not only support traditional communications, but will also support, for example, Device to Device (D2D) communication, Machine to Machine (M2M) communication, Machine Type Communication (MTC), Vehicle to Vehicle (V2V) communication, etc. The embodiments of the present disclosure can also be applied to these communication systems.

Optionally, the communication system in the embodiments of the present disclosure can be applied to a carrier aggregation (CA) scenario, a dual connectivity (DC) scenario, or a standalone (SA) deployment scenario.

There is no limitation on the frequency spectrum applied in the embodiments of the present disclosure. For example, the embodiments of present disclosure can be applied to the licensed spectrum, and can also be applied to the unlicensed spectrum.

Exemplarily, a communication system 100 to which the embodiments of the present disclosure are applied is as shown in FIG. 1. The communication system 100 may include a network device 110 which may be a device that communicates with a terminal device 120 (or referred to as a communication terminal or a terminal). The network device 110 can provide communication coverage for a specific geographic area, and can communicate with terminal devices located in the coverage area.

FIG. 1 exemplarily shows one network device and two terminal devices. Optionally, the communication system 100 may include multiple network devices and other numbers of terminal devices can be included in the coverage of each network device, which is not particularly limited in the embodiments of the present disclosure.

Optionally, the communication system 100 may also include other network entities such as a network controller and a mobility management entity, which are not limited in the embodiments of the present disclosure.

It should be understood that the device with a communication function in the network and/or system of the embodiments of the present disclosure may be referred to as the communication device. Taking the communication system 100 shown in FIG. 1 as an example, the communication device may include a network device 110 and a terminal device 120 which have the communication function. The network device 110 and the terminal device 120 may be the specific devices as described above, which will not be repeated here. The communication device may also include other devices in the communication system 100, such as a network controller, a mobility management entity, and other network entities, which are not limited in the embodiments of the present disclosure.

It should be understood that the terms "system" and "network" are often used interchangeably herein. The term "and/or" used herein is merely to describe relative relationships of relative objects, indicating that there can be three kinds of relationships. For example, A and/or B can indicate three cases where A exists alone, A and B exist simultaneously, or B exists alone. In addition, the character "/" used herein generally indicates that the related objects before and after this character are in an "or" relationship.

Various embodiments are described in combination with the terminal device and the network device in the embodiments of the present disclosure in which the terminal device may also be referred to as user equipment (UE), an access terminal, a user unit, a user station, a mobile station, a mobile site, a remote station, a remote terminal, a mobile device, a user terminal, a terminal, a wireless communication device, a user agent or a user device. The terminal device can be a station (ST) in a WLAN, which may be a cellular phone, a cordless phone, a Session Initiation Protocol (SIP) phone, a Wireless Local Loop (WLL) station, a Personal Digital Assistant (PDA) device, a handheld device with a wireless communication function, a computing device or other processing devices connected to wireless modems, a vehicle-mounted device, a wearable device, and a terminal device in next-generation communication system, such as a terminal device in the NR network or a terminal device in the future evolution of the Public Land Mobile Network (PLMN) network.

By way of example rather than limitation, in the embodiments of the present disclosure, the terminal device may also be a wearable device. The wearable device can also be referred to as a wearable smart device, which is a general term for wearable devices which are designed and developed by using wearable technology to intelligently design and develop everyday wear, such as glasses, gloves, watches, clothing and shoes. The wearable device is a portable device that is directly worn on the body or integrated into user's clothes or accessories. The wearable device is not only a hardware device, but also realizes powerful functions through software support, data interaction, and cloud interaction. In a broad sense, the wearable smart device includes full-featured and large-sized devices of which complete or partial functions can be achieved without relying on smart phones, such as smart watches or smart glasses, and devices which focus on only a certain type of application function and need to cooperate with other devices such as smart phones, such as various smart bracelets and smart jewelry for physical sign monitoring.

The network device can be a device used to communicate with a mobile device. The network device can be an access point (AP) in WLAN, a Base Transceiver Station (BTS) in GSM or CDMA, or a NodeB (NB) in WCDMA, and can also be an Evolutional Node B (eNB or eNodeB) in LTE, a relay station, an access point, a vehicle-mounted device, a wearable device, a network device or base station (gNB) in a NR network, a network device in future evolutional PLMN network, a network device in NRU, or the like.

In the embodiments of the present disclosure, the network device provides services for a cell, and the terminal device communicates with the network device through transmission resources (for example, frequency domain resources, or spectrum resources) used by the cell. The cell may be a cell corresponding to the network device (e.g., a cell corresponding to the base station), or belong to a macro base station or a base station corresponding to a small cell. The small cell herein can include a Metro cell, a Micro cell, a Pico cell, a Femto cell, etc., which are characterized in small coverage and low transmission power, and are suitable for providing high-rate data transmission services.

The technical solutions of the present disclosure will be described in detail below.

FIG. 2 is an interaction flowchart of a wireless communication method provided by an embodiment of the present disclosure. As shown in FIG. 2, the method includes the following.

In S210, a terminal device selects a first HARQ process from multiple HARQ processes corresponding to a CG resource according to a HARQ process selection rule.

In S220, the terminal device transmits data on the first HARQ process through the CG resource.

It should be understood that the multiple HARQ processes corresponding to the CG resources described above are multiple available HARQ processes. The multiple HARQ processes are part or all of the HARQ processes in a HARQ process set configured for the CG resource.

Optionally, the terminal device may obtain identifiers of the multiple HARQ processes corresponding to the CG resource.

Optionally, the identifiers of the multiple HARQ processes may be carried in configuration information of the CG resource, and of course may also be carried in other information sent by the network device to the terminal device, which is not limited in the present disclosure.

It should be understood that the identifiers of the multiple HARQ processes correspond to the multiple HARQ processes on a one-to-one basis.

Optionally, the identifiers of the multiple HARQ processes may be process numbers of the multiple HARQ processes, which is not limited in present disclosure.

Optionally, the HARQ process selection rule includes, but is not limited to, at least one of the following 1 to 6.

1. Perform selection according to a priority of the HARQ process.

2. Perform selection according to a priority of a resource corresponding to the HARQ process.

3. Perform selection according to a priority of a Logical Channels (LCH) in Media Access Control Element (MAC) Protocol Data Units (PDU) corresponding to the HARQ process.

4. Perform selection according to Quality of Service (QoS) requirement of data corresponding to the HARQ process.

5. Perform selection according to a data type corresponding to the HARQ process.

6. Perform selection according to a HARQ process number.

Optionally, the HARQ process selection rule is predefined or preconfigured, and of course it may also be dynamically configured by the network device for the terminal device, which is not limited in present disclosure.

Optionally, the resource corresponding to the HARQ process may be a CG resource or a dynamic resource, which is not limited in present disclosure.

It should be understood that multiple CG resources may share one HARQ process, and thus the resource corresponding to one HARQ process may include multiple CG resources.

Optionally, for any HARQ process, the QoS requirement of the data corresponding to the HARQ process includes a survival time of the data corresponding to the HARQ process.

Optionally, the data types includes: an initial transmission data type and/or a retransmission data type.

Optionally, the data type include: a configured grant data type and/or a dynamic grant data type.

Optionally, the data type may include at least one of the following: a data type of a URLLC service, a data type of a Vehicle to X (V2X) service, a data type of an Enhanced Mobile Broadband (eMBB) service, a data type of a Time Sensitive Communication (TSC) service, a data type of a MTC service, a data type of a service with a specific priority, and a data type of a service with specific QoS requirement.

Optionally, the above data types can be used in combination, or used separately. For example, the initial transmission data type can be divided into further data types, for example, the initial transmission data is URLLC data. Similarly, the retransmission data type can also be divided into further data types.

Optionally, the HARQ process selection rule may be a HARQ process selection rule for the initial transmission data type. It may also be a HARQ process selection rule for the retransmission data type. It can also be a HARQ process selection rule for any data type. That is, the rule has no restrictions on the data type. For example, this rule is applicable to both the initial transmission data and retransmission data, and for another example, this rule is applicable to both the URCCL service data and the V2X service data.

Optionally, the HARQ process selection rule for the initial transmission data type, the HARQ process selection rule for the retransmission data type, and the HARQ process selection rule for any data type may be completely the same, or may not be completely the same. For example, according to the HARQ process selection rule for the initial transmission data type, the data transmission is performed according to the priority of the HARQ process; according to the HARQ process selection rule for the retransmission data type, the data transmission is performed according to the priority of the resource corresponding to the HARQ process; and according to the HARQ process selection rule for any data type, the data transmission is performed according to the process number corresponding to the HARQ process. That is to say, the HARQ process selection rules in the three cases are completely different. For another example, according to the HARQ process selection rule for the initial transmission data type, the HARQ process selection rule for the retransmission data type, and the HARQ process selection rule for any data type, the data transmissions are all performed according to the priority of the HARQ process, which indicates that the HARQ process selection rules in the three case are exactly the same. For still another example, according to the HARQ process selection rules for the initial transmission data type and the retransmission data type, the data transmission is performed according to the priority of the HARQ process, and according to the HARQ process selection rule for any data type, the data transmission is performed according to the process number corresponding to the HARQ process, which indicates that the HARQ process selection rules in the three cases are not completely the same.

Optionally, at least one of the above HARQ process selection rules may be predefined, or preconfigured, or indicated by the network.

Optionally, the data corresponding to the multiple HARQ processes may all be retransmission data, or may all be initial transmission data, or part of the data may be the retransmission data and part of the data may be the initial transmission data.

It should be understood that if the data corresponding to the multiple HARQ processes is the retransmission data, correspondingly, the HARQ process selection rule may be the HARQ process selection rule for the retransmission data type, or the HARQ process selection rule for any data type. If the data corresponding to the multiple HARQ processes is the initial transmission data, correspondingly, the HARQ process selection rule may be the HARQ process selection rule for the initial transmission data type, or the HARQ process selection rule for any data type. If the data corresponding to the multiple HARQ processes is part of the initial transmission data and part of the retransmission data, correspondingly, the HARQ process selection rule may be the HARQ process selection rule for the initial transmission data type or the retransmission data type. On this basis, the terminal device needs to select a first HARQ process among the multiple HARQ processes according to this HARQ process selection rule in combination with other HARQ process selection rules. The HARQ process selection rules here is, for example, a rule of transmitting the retransmission data first and then the initial transmission data. If the data corresponding to the multiple HARQ processes is part of the initial transmission data and part of the retransmission data, correspondingly, the HARQ process selection rule may also be the HARQ process selection rule for any data type.

It should be understood that the initial transmission data in present disclosure is also referred to as newly transmitted data, which is not limited in present disclosure.

Optionally, the terminal device obtains at least one of the following information, but not limited thereto:

1. Priorities of the multiple HARQ processes.
2. Priorities of resources corresponding to the multiple HARQ processes
3. Priorities of LCHs in MAC PDUs corresponding to the multiple HARQ processes.
4. QoS requirements for data corresponding to the multiple HARQ processes.
5. Data types corresponding to the multiple HARQ processes.
6. HARQ process numbers corresponding to the multiple HARQ processes.

Optionally, at least one of the above information is carried in configuration information of the CG resource, or in other information, which is not limited in present disclosure.

The process of selecting the HARQ process will be described below in combination with the HARQ process selection rule by way of examples.

Example 1: If the HARQ process selection rule is the rule of performing selection according to the priority of the HARQ process, and the priorities of the multiple HARQ processes are different, the terminal device preferentially selects the HARQ process with the highest HARQ process priority for transmission.

Example 2: If the HARQ process selection rule is the rule of performing selection according to the resource corresponding to the HARQ process, and the priorities of the resources corresponding to the multiple HARQ processes are different, the terminal device preferentially selects the HARQ process with the highest resource priority for transmission. For example, if the CG resources corresponding to HARQ process 1 include CG resource 1 and CG resource 2, the CG resource corresponding to HARQ process 2 is CG resource 1, and the priority of CG resource 1 is lower than the priority of CG resource 2, the terminal device first transmits the data of the HARQ process 1 through the CG resource 1.

Example 3: If the HARQ process selection rule is the rule of performing selection according to the LCH in the MAC PDU corresponding to the HARQ process, and the priorities of the LCHs in the MAC PDUs corresponding to the multiple HARQ processes are different, the terminal device preferentially selects the HARQ process with the highest LCH priority for transmission.

Example 4: If the HARQ process selection rule is the rule of performing selection according to the resource corresponding to the HARQ process, and this rule is for the retransmission data, if the priorities of the resources corresponding to the multiple HARQ processes are different, and the data corresponding to the multiple HARQ processes are all retransmission data, the terminal device preferentially selects the HARQ process with the highest resource priority for data transmission.

Example 5: If the HARQ process selection rule is the rule of performing selection according to the data type corresponding to the HARQ process, and the data corresponding to the multiple HARQ processes includes retransmission data and initial transmission data, the terminal device preferentially selects the HARQ process corresponding to the initial transmission data for transmission.

Example 6: If the HARQ process selection rule is the rule of performing selection according to the data type corresponding to the HARQ process, the data corresponding to the multiple HARQ processes includes retransmission data and initial transmission data, and the initial transmission data is the data corresponding to the URLLC service, the UE preferentially selects the HARQ process corresponding to the initial transmission data for transmission.

Example 7: If the HARQ process selection rule is the rule of performing selection according to a survival time of the data corresponding to the HARQ process, the data corresponding to the multiple HARQ processes includes retransmission data and initial transmission data, the initial transmission data has a survival time, and the retransmission data does not have a survival time, the terminal device preferentially selects the HARQ process corresponding to the initial data transmission for transmission.

Example 8: If the HARQ process selection rule is the rule of performing selection according to the survival time of the data corresponding to the HARQ process, and the data corresponding to the multiple HARQ processes are retransmission data, the terminal device selects the HARQ process corresponding to the retransmission data that does not satisfy the survival time first for transmission.

To sum up, in present disclosure, the terminal device can select a first HARQ process among the multiple HARQ processes according to the HARQ process selection rule, and transmit data on the first HARQ process through the CG resource, that is, transmit the data corresponding to the first HARQ process through the CG resource. Further, the HARQ process selection rule may include at least one of the following: performing selection according to the priority of the HARQ process, performing selection according to the priority of the resource corresponding to the HARQ process, performing selection according to the priority of the LCH in the MAC PDU corresponding to the HARQ process, performing selection according to the QoS requirements of the data corresponding to the HARQ process, performing selection according to the data type corresponding to the HARQ process, and performing selection according to the HARQ process number. In this way, transmission of data corresponding to the HARQ process with a high priority, data corresponding to the resource with a high priority, data corresponding to the LCH with a high priority, or data with high QoS requirements can be prioritized, or transmission of the retransmission data can be prioritized, or transmission of data corresponding to the HARQ process number that is pre-configured or pre-defined by the network device can be prioritized, thereby ensuring timely transmission of the data.

Optionally, when a first condition is met, the terminal device selects the first HARQ process from the multiple HARQ processes according to the HARQ process selection rule.

Optionally, the first condition includes at least one of the following 1 to 5.

1. The terminal device receives first indication information.
2. The terminal device is a terminal device of R17 or later versions.
3. The terminal device is a terminal device that supports a specific service.
4. The terminal device accesses the NRU for a specific service.
5. The terminal device has the capability of selecting a HARQ process according to the HARQ process selection rule.

The first indication information is used to indicate to select the HARQ process according to the HARQ process selection rule.

Optionally, if the network device determines that the terminal device has the capability of selecting the HARQ process according to the HARQ process selection rule, or the network device determines that the terminal device supports selecting the HARQ process according to the HARQ process selection rule, the network device sends the first indication information to the terminal device. That is, only when the network device determines that the terminal device has the capability of selecting the HARQ process according to the HARQ process selection rule or the network device determines that the terminal device supports selecting the HARQ process according to the HARQ process selection rule, the network device is triggered to send the first indication information.

Optionally, the first indication information is indication information for the initial transmission data type. Alternatively, the first indication information is indication information for the retransmission data type. Alternatively, the first indication information is indication information for any data type. That is, the HARQ process selection rule indicated by the first indication information is indication information for the initial transmission data type. Alternatively, the HARQ process selection rule indicated by the first indication information is indication information for the retransmission data type. Alternatively, the HARQ process selection rule indicated by the first indication information is indication information for any data type.

Optionally, the HARQ process selection rules indicated by the first indication information for the initial transmission data type, the retransmission data type and any data type are completely the same or not completely the same. For example, the HARQ process selection rule for the initial transmission data type indicated by the first indication information is to perform data transmission according to the priority of the HARQ process, the HARQ process selection rule for the retransmission data type indicated by the first indication information is to perform data transmission according to the priority of the resource corresponding to the HARQ process, and the HARQ process selection rule for any data type indicated by the first indication information is to perform data transmission according to the process number corresponding to the HARQ process. That is to say, the HARQ process selection rules in the three cases are completely different. For another example, the HARQ process selection rule for the initial transmission data type indicated by the first indication information, the HARQ process selection rule for the retransmission data type indicated by the first indication information, and the HARQ process selection rule for any data type indicated by the first indication information are all to perform data transmission according to the priority of the HARQ process, which indicates that the HARQ process selection rules in these three cases are completely the same. For still another example, the HARQ process selection rules for the initial transmission data type and the retransmission data type indicated by the first indication information are both to perform data transmission according to the priority of the HARQ process, and the HARQ process selection rule for any data type indicated by the first indication information is to perform data transmission according to the process number corresponding to the HARQ process. That is to say, the HARQ process selection rules in these three cases are not completely the same.

Optionally, there may be one or more pieces of first indication information. For example, the first indication information is indication information for any data type, and in this case, only one piece of first indication information is required. However, when the data corresponding to the multiple HARQ processes includes the initial transmission data and the retransmission data, and the first indication information is separate indication information for different data types, multiple pieces of first indication information are required in this case.

Optionally, the first indication information is carried in the configuration information of the CG resource or in other information, but is not limited thereto.

It should be understood that the initial transmission data type for which the first indication information is used refers to the initial transmission data type corresponding to the HARQ process, and the retransmission data type for which the first indication information is used refers to the retransmission data type corresponding to the HARQ process.

Optionally, the network device determines that the terminal device has the capability of selecting a HARQ process according to the HARQ process selection rule or determines that the terminal device supports selection of the HARQ process according to the HARQ process selection rule, according to, but not limited to, at least one of the following 1 to 4.

1. The terminal device is a terminal device of R17 or later versions.
2. The terminal device is a terminal device that supports a specific service.
3. The terminal device accesses the NRU for a specific service.
4. The network device receives capability information sent by the terminal device, and the capability information is used to indicate that the terminal device has the capability of selecting the HARQ process according to the HARQ process selection rule.

Optionally, the specific service includes, but is not limited to, at least one of the following: a first service, and a service with a specific priority.

Optionally, the first service includes, but is not limited to, at least one of the following: a V2X service, a Time Sensitive Communication (TSC) service, and a URLLC service.

To sum up, in present disclosure, when the terminal device satisfies the first condition, the terminal device selects the first HARQ process among the multiple HARQ processes according to the HARQ process selection rule. It is not in all cases that the terminal device selects the first HARQ process among the multiple HARQ processes according to the HARQ process selection rule, thereby improving the flexibility of HARQ process selection.

As described above, in the CG enhancement scheme in the NRU, the CG retransmission timer and the state of the HARQ process are introduced to support the data transmission or retransmission triggered when the CG resource cannot be transmitted or the transmission fails due to LBT failure. After the CG retransmission timer expires, if the CG timer does not expire and no network feedback is received, the data of the corresponding HARQ process can be transmitted on the available CG resource. Then when to start or restart the CG timer and/or the CG retransmission timer is a technical problem to be solved urgently in present disclosure.

It should be understood that the network device may configure at least one of the following for the terminal device: identifiers of HARQ processes in the HARQ process set corresponding to the CG resource of the terminal device, a CG retransmission timer, and a CG timer.

Optionally, at least one of the identifiers of the HARQ processes in the HARQ process set corresponding to the CG resource of the terminal device, the CG retransmission timer, and the CG timer may be carried in the configuration information sent by the network device to the terminal device, or may be carried in other information sent by the network device to the terminal device, which is not limited in present disclosure.

Optionally, the terminal device starts at least one of the CG timer and the CG retransmission timer at a first time. Or, the terminal device restarts at least one of the CG timer and the CG retransmission timer at the first time.

Optionally, the terminal device starting the at least one of the CG timer and the CG retransmission timer at the first time includes that the terminal device starts the at least one of the CG timer and the CG retransmission timer at the first time when a second condition is met.

Optionally, the terminal device restarting the at least one of the CG timer and the CG retransmission timer at the first time includes that the terminal device restarts the at least one of the CG timer and the CG retransmission timer at the first time when a second condition is met.

Optionally, the second condition includes, but is not limited to, at least one of the following 1 to 24.

1. A priority of a resource for the terminal device is lower than or equal to priorities of other resources.
2. A CG resource corresponding to the terminal device conflicts with other resources.
3. A MAC PDU corresponding to the CG resource cannot be transmitted.
4. A priority of the MAC PDU corresponding to the CG resource is lower than or equal to priorities of other MAC PDUs.
5. Data corresponding to the CG resource corresponding to the terminal device is not transmitted.
6. The data corresponding to the CG resource corresponding to the terminal device is not transmitted by a physical layer.
7. The data transmission corresponding to the CG resource corresponding to the terminal device is canceled.
8. The data transmission corresponding to the CG resource corresponding to the terminal device is not performed.
7. The transmission corresponding to the CG resource corresponding to the terminal device is canceled.
10. The transmission corresponding to the CG resource corresponding to the terminal device is not performed.
12. The terminal device is configured with an autonomous transmission parameter autonomousTx.
12. The CG retransmission timer is not configured.
13. The CG retransmission timer is not running.
14. The HARQ process corresponding to the CG resource is pending.

15. The CG retransmission timer is not configured, and the resource (or PUSCH) corresponds to a CG resource with a low priority.
16. The CG retransmission timer is configured, and the HARQ process corresponding to the CG resource is pending.
17. The CG retransmission timer is configured, and the HARQ process corresponding to the CG resource is not pending, the transmission is not performed, and the terminal device is configured with an autonomous transmission parameter.
18. The CG retransmission timer is configured, and the HARQ process corresponding to the CG resource is not pending, and the terminal device is configured with an autonomous transmission parameter.
19. The CG retransmission timer is configured, and the HARQ process corresponding to the CG resource is not pending.
20. The resource (or PUSCH) corresponds to a CG resource with a low priority.
21. The HARQ process corresponding to the CG resource is not pending.
22. The HARQ process corresponding to the CG resource is pending.
23. The HARQ process corresponding to the CG resource is not pending, and an autonomous transmission parameter is configured.
24. The HARQ process corresponding to the CG resource is not pending, the transmission is not performed, and an autonomous transmission parameter is configured.

Optionally, the resource of the terminal device is described as an uplink resource of the terminal device, such as a Physical Uplink Shared Channel (PUSCH) resource or a Physical Uplink Control Channel (PUCCH) resource. The resource of the terminal device may be the CG resource of the terminal device, or other resources of the terminal device. When the resource of the terminal device is the CG resource, the priority of the resource of the terminal device is lower than or equal to priorities of other resources. The other resources can be other resources, such as other CG resources, DG resources, PUCCH resources, etc., of the terminal device. When the resource of the terminal device is the CG resource, the other resources can be resources of other terminal devices. When the resource of the terminal device is not the CG resource, the other resources may be resources of other terminal devices.

Optionally, in present disclosure, the CG resource may be replaced by an uplink grant resource, that is, the uplink grant resource may be the CG resource or other uplink grant resources, which is not limited in present disclosure.

It should be understood that the priority of the resource of the terminal device being lower than or equal to the priorities of other resources is also described as the resource of the terminal device being a low-priority resource.

Optionally, when the resource of the terminal device is a CG resource, the reason why the CG resource is a low-priority resource includes, but is not limited to, at least one of the following: the CG resource conflicts with other resources, the CG resource corresponds to a MAC PDU that is not preferentially transmitted, the data corresponding to the CG resource is not transmitted, the data corresponding to the CG resource is not transmitted by the physical layer, the data transmission corresponding to the CG resource is canceled, and the transmission of the CG resource is not performed.

Optionally, the other resources in conflict between the CG resource and other resources may be dynamic resources or other resources of the terminal device, or CG resources or dynamic resources of other terminal devices, which is not limited in present disclosure.

Optionally, the MAC PDU corresponding to the CG resource cannot be transmitted, for example, it cannot be transmitted by the physical layer due to the conflict, or the priority of the MAC PDU corresponding to the CG resource is lower than or equal to the priorities of other MAC PDUs. That is, the CG resource corresponds to a MAC PDU with a low transmission priority.

It should be understood that the above autonomous transmission parameter autonomousTx is also described as the autonomous transmission parameter autonomousTx in the URLLC service.

Optionally, the first time is later than or the same as an end time of the last time domain symbol of the CG resource. That is, the first time may be the end time of the last time domain symbol of the CG resource, or may be later than the end time of the last time domain symbol of the CG resource.

Optionally, the method further includes that the terminal device makes the HARQ process corresponding to the CG resource be pending and/or determines that the data corresponding to the CG resource is transmitted, if the terminal device meets a third condition and any one of the following: the terminal device is not configured with the autonomous transmission parameter, the terminal device is not configured with the autonomous transmission parameter and is configured to perform resource selection based on a LCH priority, and the terminal device uses NRU autonomous retransmission.

Optionally, the method further includes that the terminal device makes the HARQ process corresponding to the CG resource be pending and/or determines that the data corresponding to the CG resource is not transmitted, if the terminal device meets a third condition and any one of the following: the terminal device is not configured with the autonomous transmission parameter, the terminal device is not configured with the autonomous transmission parameter and is configured to perform resource selection based on a LCH priority, or the terminal device uses NRU autonomous retransmission.

Optionally, the method further includes that the terminal device makes the HARQ process corresponding to the CG resource be not pending and/or the terminal device determines that the data corresponding to the CG resource is not transmitted, if the terminal device meets a third condition and any one of the following: the terminal device is configured with the autonomous transmission parameter, the terminal device is configured with the autonomous transmission parameter and is configured to perform resource selection based on a LCH priority, or the terminal device uses URLLC autonomous transmission.

Optionally, the third condition includes, but is not limited to, at least one of the following 1 to 13.

1. A priority of the resource corresponding to the HARQ process in previous data transmission is lower than or equal to priorities of other resources.
2. A MAC PDU corresponding to the HARQ process cannot be transmitted.
3. A priority of the MAC PDU corresponding to the HARQ process is lower than or equal to priorities of other MAC PDUs.
4. The data corresponding to the HARQ process is not transmitted.
5. The data transmission corresponding to the HARQ process is canceled.
6. The data of the terminal device is not transmitted.

7. The data transmission of the terminal device is canceled.
8. The data transmission corresponding to the CG resource is not performed.
9. The transmission corresponding to the CG resource is canceled.
10. The transmission corresponding to the CG resource is not performed.
11. No LBT failure indication is received.
12. The resource of the terminal device have a priority lower than or equal to priorities of resources of other terminal devices.
13. The CG retransmission timer is not running.

It should be understood that the previous data transmission of the HARQ process may be the last data transmission before the current data transmission, or may not be the last data transmission, for example, it may be the data transmission separated from the current data transmission by several data transmissions.

Optionally, the resource corresponding to the previous data transmission is described as the uplink resource for the previous data transmission of the terminal device, for example, a PUSCH resource or a PUCCH resource. The resource corresponding to the previous data transmission may be the CG resource of the terminal device in the previous data transmission, or other resources of the terminal device in the previous data transmission. When the resource is the CG resource, the priority of the resource corresponding to the previous data transmission is lower than or equal to the priorities of other resources, and the other resources may be other resources of the terminal device, such as dynamic resources or another CG resource or PUCCH resource; when the resource of the terminal device is the CG resource, the other resources may be resources of other terminal devices; and when it is not the CG resource, the other resources may be resources of other terminal devices.

In summary, present disclosure provides a solution as to when to start or restart the CG timer and/or CG retransmission timer. For example, it is ensured that the latest CG resource will not be unusable because the CG timer is running, which will otherwise results in latency of transmission of the MAC PDU with a low priority. For another example, it is ensured that the URLLC autonomous transmission mechanism can operate normally. Therefore when the CG timer is running, the transmission can be accordingly deemed to be performed. Only when the transmission of low-priority resources is deemed not to be performed, can the URLLC autonomous transmission mechanism operate normally.

When to stop the CG timer and/or the CG retransmission timer is a technical problem to be solved urgently in present disclosure. In order to solve this technical problem, the disclosure provides the following technical solutions.

Optionally, the terminal device stops the CG timer and/or the CG retransmission timer when a second condition is met. Or, before the terminal device stops the CG timer and/or the CG retransmission timer when the second condition is met, it first determines whether the CG timer and/or the CG retransmission timer is running, and if it is running, the terminal device stops the CG timer and/or the CG retransmission timer when the second condition is met.

Optionally, the second condition includes, but is not limited to, at least one of the following 1 to 24.

1. A priority of the resource of the terminal device is lower than or equal to priorities of other resources.

2. A CG resource corresponding to the terminal device conflicts with other resources.

3. A MAC PDU corresponding to the CG resource cannot be transmitted.

4. A priority of the MAC PDU corresponding to the CG resource is lower than or equal to priorities of other MAC PDUs.

5. Data corresponding to the CG resource corresponding to the terminal device is not transmitted.

6. The data corresponding to the CG resource corresponding to the terminal device is not transmitted by a physical layer.

7. The data transmission corresponding to the CG resource corresponding to the terminal device is canceled.

8. The data transmission corresponding to the CG resource corresponding to the terminal device is not performed.

9. The transmission corresponding to the CG resource corresponding to the terminal device is canceled.

10. The transmission corresponding to the CG resource corresponding to the terminal device is not performed.

12. The terminal device is configured with an autonomous transmission parameter autonomousTx.

12. The CG retransmission timer is not configured.

13. The CG retransmission timer is not running.

14. The HARQ process corresponding to the CG resource is pending.

15. The CG retransmission timer is not configured, and the resource (or PUSCH) corresponds to a CG resource with a low priority.

16. The CG retransmission timer is configured, and the HARQ process corresponding to the CG resource is pending.

17. The CG retransmission timer is configured, and the HARQ process corresponding to the CG resource is not pending, the transmission is not performed, and the terminal device is configured with an autonomous transmission parameter.

18. The CG retransmission timer is configured, and the HARQ process corresponding to the CG resource is not pending, and the terminal device is configured with an autonomous transmission parameter.

19. The CG retransmission timer is configured, and the HARQ process corresponding to the CG resource is not pending.

20. The resource (or PUSCH) corresponds to a CG resource with a low priority.

21. The HARQ process corresponding to the CG resource is not pending.

22. The HARQ process corresponding to the CG resource is pending.

23. The HARQ process corresponding to the CG resource is not pending, and an autonomous transmission parameter is configured.

24. The HARQ process corresponding to the CG resource is not pending, the transmission is not performed, and an autonomous transmission parameter is configured.

Optionally, if the terminal device is not configured with the autonomous transmission parameter, or if the terminal device is not configured with the autonomous transmission parameters and is configured to perform resource selection based on the LCH priority, or when the terminal device uses the NRU autonomous retransmission, and if a third condition is satisfied, the terminal device makes the HARQ process corresponding to the CG resource be pending and/or determines that the data corresponding to the CG resource is not transmitted.

Optionally, if the terminal device is not configured with the autonomous transmission parameter, or if the terminal device is not configured with the autonomous transmission parameters and is configured to perform resource selection based on the LCH priority, or when the terminal device uses the NRU autonomous retransmission, and if a third condition is satisfied, the terminal device makes the HARQ process corresponding to the CG resource be pending and/or determines that the data corresponding to the CG resource is transmitted.

Optionally, if the terminal device is configured with the autonomous transmission parameter, or the terminal device is configured with the autonomous transmission parameter and is configured to perform resource selection based on the LCH priority, or the terminal device uses the URLLC autonomous transmission, and if a third condition is satisfied, the terminal device makes the HARQ process corresponding to the CG resource be not pending and/or determines that the data corresponding to the CG resource is not transmitted.

Optionally, the third condition includes, but is not limited to, at least one of the following 1 to 13.

1. A priority of the resource corresponding to the HARQ process in previous data transmission is lower than or equal to priorities of other resources.

2. A MAC PDU corresponding to the HARQ process cannot be transmitted.

3. A priority of the MAC PDU corresponding to the HARQ process is lower than or equal to priorities of other MAC PDUs.

4. Data corresponding to the HARQ process is not transmitted.

5. Data transmission corresponding to the HARQ process is canceled.

6. Data of the terminal device is not transmitted.

7. Data transmission of the terminal device is canceled.

8. Data transmission corresponding to the CG resource is not performed.

9. Transmission corresponding to the CG resource is canceled.

10. Transmission corresponding to the CG resource is not performed.

11. No LBT failure indication is received.

12. The resource of the terminal device has a priority lower than or equal to priorities of resources of other terminal devices.

13. The CG retransmission timer is not running.

It should be noted that, for explanations of the second condition and the third condition, reference may be made to the contents of the previous embodiments, which will not be repeated in present disclosure.

In summary, the present disclosure provides a solution as to when to stop the CG timer and/or CG retransmission timer. For example, it is ensured that the latest CG resource will not be unusable because the CG timer is running, which will otherwise results in latency of transmission of the MAC PDU with a low priority. For another example, it is ensured that the URLLC autonomous transmission mechanism can operate normally. Therefore when the CG timer is running, the transmission can be accordingly deemed to be performed. Only when the transmission of low-priority resources is deemed not to be performed, can the URLLC autonomous transmission mechanism operate normally.

The method embodiments of the present disclosure are described in detail above with reference to FIG. 2, and the device embodiments of the present disclosure are described in detail below in conjunction with FIGS. 3 to 9. It should be understood that the device embodiments and the method embodiments correspond to each other, and for similar description, reference can be made to the method embodiments.

FIG. 3 shows a schematic block diagram of a terminal device 300 according to an embodiment of the present disclosure. As shown in FIG. 3, the terminal device 300 includes a communication unit 310 and a processing unit 320. The processing unit 320 is configured to select a first HARQ process from multiple HARQ processes corresponding to a CG resource according to a HARQ process selection rule. The communication unit 310 is configured to transmit data on the first HARQ process through the CG resource.

Optionally, the HARQ process selection rule includes at least one of the following:

performing selection according to priorities of the HARQ processes;
    performing selection according to priorities of resources corresponding to the HARQ processes;
    performing selection according to a priority of a LCH in a MAC PDU corresponding to the HARQ process;
    performing selection according to QoS requirements of data corresponding to the HARQ process;
    performing selection according to data types corresponding to the HARQ processes; and
    performing selection according to HARQ process numbers.

Optionally, the data types include an initial transmission data type and a retransmission data type.

Optionally, the data types include a configured grant data type and/or a dynamic grant data type.

Optionally, the data types include at least one of the following: a data type of a URLLC service, a data type of a V2X service, a data type of an eMBB service, a data type of a TSC service, a data type of a MTC service, a data type of service with a specific priority, and a data type of a service with specific QoS requirement.

Optionally, for any HARQ process, the QoS requirement of the data corresponding to the HARQ process includes a survival time of the data corresponding to the HARQ process.

Optionally, the HARQ process selection rule is predefined or preconfigured.

Optionally, the processing unit 320 is specifically configured to select the first HARQ process from the multiple HARQ processes according to the HARQ process selection rule if a first condition is met.

Optionally, the first condition includes at least one of the following:

the terminal device receives first indication information, where the first indication information is used to indicate to select the HARQ process according to the HARQ process selection rule;
    the terminal device is a terminal device of R17 or later versions;
    the terminal device is a terminal device that supports a specific service;
    the terminal device accesses the new radio in unlicensed spectrum (NRU) for a specific service; and
    the terminal device has a capability of selecting a HARQ process according to the HARQ process selection rule.

Optionally, the specific service includes at least one of the following: a first service, and a service with a specific priority.

Optionally, the first service includes at least one of the following: a V2X service, a TSC service, and a URLLC service.

Optionally, the first indication information is indication information for the initial transmission data type, or the first indication information is indication information for the retransmission data type, or the first indication information is indication information for any data type.

Optionally, the HARQ process selection rules indicated by the first indication information for the initial transmission data type, the retransmitted data type and any data type are completely the same or not completely the same.

Optionally, the first indication information is carried in configuration information of the CG resource or in other information.

Optionally, the processing unit 320 is also configured to obtain at least one of the following information:

priorities of multiple HARQ processes;
    priorities of resources corresponding to the multiple HARQ processes;
    priorities of LCHs in MAC PDUs corresponding to the multiple HARQ processes;
    QoS requirements for data corresponding to the multiple HARQ processes;
    data types corresponding to the multiple HARQ processes; and
    HARQ process numbers corresponding to the multiple HARQ processes.

Optionally, at least one piece of the above information is carried in configuration information of the CG resource or in other information.

Optionally, in some embodiments, the communication unit may be a communication interface or a transceiver, or an input/output interface of a communication chip or a system-on-chip. The processing unit may be one or more processors.

It should be understood that the terminal device 300 according to the embodiments of the present disclosure may correspond to the terminal device in the method embodiments as described above, and the above-mentioned and other operations and/or functions of the units in the terminal device 300 are used to implement the respective processes in the method embodiments, which will not be repeated here for the sake of brevity.

FIG. 4 shows a schematic block diagram of a network device 400 according to an embodiment of the present disclosure. As shown in FIG. 4, the network device 400 includes a communication unit 410, configured to receive data on a first HARQ process transmitted by the terminal device through a CG resource; where the first HARQ process is a HARQ process selected by the terminal device from multiple HARQ processes corresponding to the CG resource according to a HARQ process selection rule.

Optionally, the communication unit 410 is further configured to send first indication information to the terminal device. The first indication information is used to indicate to select the HARQ process according to the HARQ process selection rule.

Optionally, it further includes a processing unit 420, configured to determine that the terminal device has a capability of selecting a HARQ process according to the HARQ process selection rule, or the network device determines that the terminal device supports selecting a HARQ process according to the HARQ process selection rule.

Optionally, the processing unit 420 specifically determines that the terminal device has the capability of selecting the HARQ process according to the HARQ process selection rule or determines that the terminal device supports selection of the HARQ process according to the HARQ process selection rule, according to at least one of the following: the terminal device is a terminal device of R17 and later versions, the terminal device is a terminal device that supports a specific service, the terminal device accesses the NRU for a specific service, and the network device receives capability information sent by the terminal device where the capability information is used to indicate that the terminal device has the capability of selecting the HARQ process according to the HARQ process selection rule.

Optionally, the specific service includes at least one of the following: a first service, and a service with a specific priority.

Optionally, the first service includes at least one of the following: a V2X service, a TSC service, and a URLLC service.

Optionally, the HARQ process selection rule includes at least one of the following:

performing selection according to a priority of the HARQ processes;

performing selection according to a priority of resources corresponding to the HARQ processes;

performing selection according to a priority of a LCH in a MAC PDU corresponding to the HARQ process;

performing selection according to QoS requirements of data corresponding to the HARQ process;

performing selection according to a data type corresponding to the HARQ processes; and performing selection according to a HARQ process number.

Optionally, the data type includes an initial transmission data type and/or a retransmission data type.

Optionally, the data type includes a configured grant data type and/or a dynamic grant data type.

Optionally, the data type includes at least one of the following: a data type of a URLLC service, a data type of a V2X service, a data type of a eMBB service, a data type of a TSC service, a data type of a MTC service, a data type of a service with a specific priority, and a data type of a service with specific QoS requirement.

Optionally, for any HARQ process, the QoS requirement of the data corresponding to the HARQ process includes a survival time of the data corresponding to the HARQ process.

Optionally, the HARQ process selection rule is predefined or preconfigured.

Optionally, the first indication information is indication information for the initial transmission data type, or the first indication information is indication information for the retransmission data type, or the first indication information is indication information for any data type.

Optionally, the HARQ process selection rules indicated by the first indication information for the initial transmission data type, the retransmitted data type and any data type are completely the same or not completely the same.

Optionally, the first indication information is carried in configuration information of the CG resource or in other information.

Optionally, the communication unit 410 is further configured to send at least one of the following information to the terminal device:

priorities of the multiple HARQ processes corresponding to CG resources;

priorities of resources corresponding to the multiple HARQ processes;

priorities of LCHs in MAC PDUs corresponding to the multiple HARQ processes;

QoS requirements for data corresponding to the multiple HARQ processes;

data types corresponding to the multiple HARQ processes; and

HARQ process numbers corresponding to the multiple HARQ processes.

Optionally, at least one piece of the above information is carried in configuration information of the CG resource or in other information.

Optionally, in some embodiments, the communication unit may be a communication interface or a transceiver, or an input/output interface of a communication chip or a system-on-chip. The processing unit may be one or more processors.

It should be understood that the network device 400 according to the embodiments of the present disclosure may correspond to the network device in the method embodiments above, and the above-mentioned and other operations and/or functions of the units in the network device 400 are used to implement the corresponding process in the method embodiments, which will not be repeated here for the sake of brevity.

FIG. 5 shows a schematic block diagram of a terminal device 500 according to an embodiment of the present disclosure. As shown in FIG. 5, the terminal device 500 includes: a processing unit 510 configured to start at least one of a CG timer and a CG retransmission timer at a first time, or to restart at least one of the CG timer and the CG retransmission timer at the first time.

Optionally, the processing unit 510 is specifically configured to: start the at least one of the CG timer and the CG retransmission timer at the first time when a second condition is met.

Optionally, the processing unit 510 is specifically configured to: restart the at least one of the CG timer and the CG retransmission timer at the first time when the second condition is met.

Optionally, the second condition includes at least one of the following:

a priority of a resource for the terminal device is lower than or equal to priorities of other resources;

a CG resource corresponding to the terminal device conflicts with other resources;

a MAC PDU corresponding to the CG resource cannot be transmitted;

a priority of the MAC PDU corresponding to the CG resource is lower than or equal to priorities of other MAC PDUs;

data corresponding to the CG resource is not transmitted;

data corresponding to the CG resource is not transmitted by a physical layer;

data transmission corresponding to the CG resource is canceled;

data transmission corresponding to the CG resource is not performed;

transmission corresponding to the CG resource is canceled;

transmission corresponding to the CG resource is not performed;

the terminal device is configured with an autonomous transmission parameter;

the CG retransmission timer is not configured;

the CG retransmission timer is not running;

the HARQ process corresponding to the CG resource is pending;

the CG retransmission timer is not configured, and the resource (or PUSCH) corresponds to a CG resource with a low priority;

the CG retransmission timer is configured, and the HARQ process corresponding to the CG resource is pending;

the CG retransmission timer is configured, and the HARQ process corresponding to the CG resource is not pending, the transmission is not performed, and the terminal device is configured with an autonomous transmission parameter;

the CG retransmission timer is configured, and the HARQ process corresponding to the CG resource is not pending, and the terminal device is configured with an autonomous transmission parameter;

the CG retransmission timer is configured, and the HARQ process corresponding to the CG resource is not pending;

the resource (or PUSCH) corresponds to a CG resource with a low priority;

the HARQ process corresponding to the CG resource is not pending;

the HARQ process corresponding to the CG resource is pending;

the HARQ process corresponding to the CG resource is not pending, and an autonomous transmission parameter is configured; and the HARQ process corresponding to the CG resource is not pending, the transmission is not performed, and an autonomous transmission parameter is configured.

Optionally, the processing unit 510 is further configured to make the HARQ process corresponding to the CG resource be pending and/or to determine that the data corresponding to the CG resource is transmitted, if any one of the following is met and a third condition is met: the terminal device is not configured with the autonomous transmission parameter, the terminal device is not configured with the autonomous transmission parameter and is configured to perform resource selection based on a LCH priority, or the terminal device uses NRU autonomous retransmission.

Optionally, the processing unit 510 is further configured to make the HARQ process corresponding to the CG resource be pending and/or to determine that the data corresponding to the CG resource is not transmitted, if any one of the following is met and a third condition is met: the terminal device is not configured with the autonomous transmission parameter, the terminal device is not configured with the autonomous transmission parameter and is configured to perform resource selection based on a LCH priority, or the terminal device uses NRU autonomous retransmission.

Optionally, the processing unit 510 is further configured to make the HARQ process corresponding to the CG resource be not pending and/or to determine that the data corresponding to the CG resource is not transmitted, if any one of the following is met and a third condition is met: the autonomous transmission parameter is configured, the terminal device is configured with the autonomous transmission parameter and is configured to perform resource selection based on a LCH priority, or the terminal device uses URLLC autonomous transmission.

Optionally, the third condition includes at least one of the following:

a priority of the resource corresponding to the HARQ process in previous data transmission is lower than or equal to priorities of other resources;

a MAC PDU corresponding to the HARQ process cannot be transmitted;

a priority of the MAC PDU corresponding to the HARQ process is lower than or equal to priorities of other MAC PDUs;

data corresponding to the HARQ process is not transmitted;

data transmission corresponding to the HARQ process is canceled;

data of the terminal device is not transmitted;

data transmission of the terminal device is canceled;

data transmission corresponding to the CG resource is not performed;

transmission corresponding to the CG resource is canceled;

transmission corresponding to the CG resource is not performed;

no LBT failure indication is received;

the resource of the terminal device has a priority lower than or equal to priorities of resources of other terminal devices; and the CG retransmission timer is not running.

Optionally, the first time is later than or the same as an end time of a last time-domain symbol of the CG resource.

Optionally, in some embodiments, the processing unit may be one or more processors.

It should be understood that the terminal device 500 according to the embodiments of the present disclosure may correspond to the terminal device in the method embodiments above, and the above-mentioned and other operations and/or functions of the units in the terminal device 500 are used to implement the respective processes in the method embodiments, which will not be repeated here for the sake of brevity.

FIG. 6 shows a schematic block diagram of a terminal device 600 according to an embodiment of the present disclosure. As shown in FIG. 6, the terminal device 600 includes: a processing unit 610 configured to stop at least one of a CG timer and a CG retransmission timer when a second condition is met.

Optionally, the processing unit 610 is specifically configured to: stop at least one of the CG timer and the CG retransmission timer when the second condition is met, if the at least one of the CG timer and the CG retransmission timer is running.

Optionally, the second condition includes at least one of the following:

a priority of a resource for the terminal device is lower than or equal to priorities of other resources;

a CG resource corresponding to the terminal device conflicts with other resources;

a MAC PDU corresponding to the CG resource cannot be transmitted;

a priority of the MAC PDU corresponding to the CG resource is lower than or equal to priorities of other MAC PDUs;

data corresponding to the CG resource is not transmitted;

data corresponding to the CG resource is not transmitted by a physical layer;

data transmission corresponding to the CG resource is canceled;

data transmission corresponding to the CG resource is not performed;

transmission corresponding to the CG resource is canceled;

transmission corresponding to the CG resource is not performed;

the terminal device is configured with an autonomous transmission parameter;

the CG retransmission timer is not configured;

the CG retransmission timer is not running;

the HARQ process corresponding to the CG resource is pending;

the CG retransmission timer is not configured, and the resource (or PUSCH) corresponds to a CG resource with a low priority;

the CG retransmission timer is configured, and the HARQ process corresponding to the CG resource is pending;

the CG retransmission timer is configured, and the HARQ process corresponding to the CG resource is not pending, the transmission is not performed, and the terminal device is configured with an autonomous transmission parameter;

the CG retransmission timer is configured, and the HARQ process corresponding to the CG resource is not pending, and the terminal device is configured with an autonomous transmission parameter;

the CG retransmission timer is configured, and the HARQ process corresponding to the CG resource is not pending;

the resource (or PUSCH) corresponds to a CG resource with a low priority;

the HARQ process corresponding to the CG resource is not pending;

the HARQ process corresponding to the CG resource is pending;

the HARQ process corresponding to the CG resource is not pending, and the autonomous transmission parameter is configured; and the HARQ process corresponding to the CG resource is not pending, the transmission is not performed, and the autonomous transmission parameter is configured.

Optionally, the processing unit 610 is further configured to make the HARQ process corresponding to the CG resource be pending and/or to determine that the data corresponding to the CG resource is transmitted, if any one of the following is met and a third condition is met: the terminal device is not configured with the autonomous transmission parameter, the terminal device is not configured with the autonomous transmission parameter and is configured to perform resource selection based on a LCH priority, or the terminal device uses NRU autonomous retransmission.

Optionally, the processing unit 610 is further configured to make the HARQ process corresponding to the CG resource be pending and/or to determine that the data corresponding to the CG resource is not transmitted, if any one of the following is met and a third condition is met: the terminal device is not configured with the autonomous transmission parameter, the terminal device is not configured with the autonomous transmission parameter and is configured to perform resource selection based on a LCH priority, or the terminal device uses NRU autonomous retransmission.

Optionally, the processing unit 610 is further configured to make the HARQ process corresponding to the CG resource be not pending and/or to determine that the data corresponding to the CG resource is not transmitted, if any one of the following is met and a third condition is met: the terminal device is configured with the autonomous transmission parameter, the terminal device is configured with the autonomous transmission parameter and is configured to perform resource selection based on a LCH priority, or the terminal device uses URLLC autonomous transmission.

Optionally, the third condition includes at least one of the following:

a priority of the resource corresponding to the HARQ process in previous data transmission is lower than or equal to priorities of other resources;

a MAC PDU corresponding to the HARQ process cannot be transmitted;

a priority of the MAC PDU corresponding to the HARQ process is lower than or equal to priorities of other MAC PDUs;

data corresponding to the HARQ process is not transmitted;

data transmission corresponding to the HARQ process is canceled;

data of the terminal device is not transmitted;

data transmission of the terminal device is canceled;

data transmission corresponding to the CG resource is not performed;

transmission corresponding to the CG resource is canceled;

transmission corresponding to the CG resource is not performed;

no LBT failure indication is received;

the resource of the terminal device has a priority lower than or equal to priorities of resources of other terminal devices; and the CG retransmission timer is not running.

Optionally, in some embodiments, the processing unit may be one or more processors.

It should be understood that the terminal device 600 according to the embodiments of the present disclosure may correspond to the terminal device in the method embodiments above, and the above-mentioned and other operations and/or functions of the units in the terminal device 600 are used to implement the respective processes in the method embodiments, which will not be repeated here for the sake of brevity.

FIG. 7 is a schematic structural diagram of a communication device 700 according to an embodiment of the present disclosure. The communication device 700 shown in FIG. 7 includes a processor 710. The processor 710 can call and execute a computer program from a memory to carry out the methods in the embodiments of the present disclosure.

Optionally, as shown in FIG. 7, the communication device 700 can further include a memory 720. The processor 710 can call and run the computer program from the memory 720 to carry out the methods in the embodiments of the present disclosure.

The memory 720 can be a separate device independent of the processor 710, or can be integrated in the processor 710.

Optionally, as shown in FIG. 7, the communication device 700 can further include a transceiver 730, and the processor 710 can control the transceiver 730 to communicate with other devices, and specifically to transmit information or data to other devices, or receive information or data transmitted from other devices.

The transceiver 730 can include a transmitter and a receiver. The transceiver 730 can further include an antenna, and the number of the antennas can be one or more.

Optionally, the communication device 700 can specifically be a network device in the embodiments of the present disclosure, and the communication device 700 can carry out the corresponding processes which are implemented by the network device in the methods of the embodiments of the present disclosure, which will not be repeated here for the sake of brevity.

Optionally, the communication device 700 can specifically be the terminal device in the embodiments of the present disclosure, and the communication device 700 can carry out the corresponding processes which are implemented by the terminal device in the methods of the embodiments of the present disclosure, which will not be repeated here for the sake of brevity.

FIG. 8 is a schematic structural diagram of an apparatus according to an embodiment of the present disclosure. The apparatus 800 shown in FIG. 8 includes a processor 810 which can call and run a computer program from a memory to carry out the methods in the embodiments of the present disclosure.

Optionally, as shown in FIG. 8, the apparatus 800 can further include a memory 820. The processor 810 can call and run the computer program from the memory 820 to carry out the methods in the embodiments of the present disclosure.

The memory 820 can be a separate device independent of the processor 810, or can be integrated in the processor 810.

Optionally, the apparatus 800 can further include an input interface 830. The processor 810 can control the input interface 830 to communicate with other devices or chips, and specifically, to obtain information or data transmitted by other devices or chips.

Optionally, the apparatus 800 can further include an output interface 840. The processor 810 can control the output interface 840 to communicate with other devices or chips, and specifically, to output information or data to other devices or chips.

Optionally, the apparatus can be applied to the network device in the embodiments of the present disclosure, and the apparatus can carry out the corresponding processes which are implemented by the network device in the methods of the embodiments of the present disclosure, which will not be repeated here for the sake of brevity.

Optionally, the apparatus can be applied to the terminal device in the embodiments of the present disclosure, and the apparatus can carry out the corresponding processes which are implemented by the terminal device in the methods of the embodiments of the present disclosure, which will not be repeated here for the sake of brevity.

Optionally, the apparatus mentioned in the embodiments of the present disclosure may also be a chip. For example, it may be a system level chip, a system chip, a chip system, a system-on-a-chip, or the like.

FIG. 9 is a schematic block diagram of a communication system 900 according to an embodiment of the present disclosure. As shown in FIG. 9, the communication system 900 includes a terminal device 910 and a network device 920.

The terminal device 910 can be configured to implement the corresponding functions implemented by the terminal device in the above methods, and the network device 920 can be used to implement the corresponding functions implemented by the network device or the base station in the above methods, which will not be repeated here for the sake of brevity.

It should be understood that the processor according to the embodiments of the present disclosure can be an integrated circuit chip with signal processing capability. In the implementations, the foregoing method embodiments can be completed by an integrated logic circuit of hardware in the processor or by instructions in a form of software. The foregoing processor can be a general-purpose processor, a Digital Signal Processor (DSP), an Application Specific Integrated Circuit (ASIC), a Field Programmable Gate Array (FPGA), other programmable logic devices, a discrete gate or transistor logic device, or a discrete hardware component, which can implement the methods and logical blocks disclosed in the embodiments of the present disclosure. The general-purpose processor can be a microprocessor, any conventional processor or the like. The methods disclosed in connection with the embodiments of the present disclosure can be directly embodied in and performed by a hardware decoding processor, or can be implemented by a combination of hardware and software modules in the decoding processor. The software modules can be located in a mature storage medium in the art such as a random access memory, a flash memory, a read-only memory, a programmable read-only memory, an electrically erasable programmable memory, a register, or the like. The storage medium is located in the memory, and the processor reads information in the memory and implements the above methods in combination with the hardware thereof.

It can be understood that the memory in the embodiments of the present disclosure may be a volatile memory or a non-volatile memory, or may include both the volatile and non-volatile memories. The non-volatile memory can be a Read-Only Memory (ROM), a Programmable ROM (PROM), an erasable PROM (EPROM), an electrically EPROM (EEPROM) or a flash memory. The volatile memory may be a Random Access Memory (RAM), which is used as an external cache. By way of exemplary but not restrictive description, many forms of RAMs are available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM)) and a Direct Rambus RAM (DR RAM). It should be noted that the memories of the systems and methods described herein are intended to include, but are not limited to, these and any other suitable types of memories.

It should be understood that the foregoing description of the memory is exemplary rather than limiting. For example, the memory in the embodiments of the present disclosure can also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch-Link DRAM (SLDRAM), a Direct Rambus RAM (DR RAM), among others. That is to say, the memory in the embodiments of the present disclosure is intended to include but is not limited to those and any other suitable types of memories.

An embodiment of the present disclosure also provides a computer-readable storage medium for storing a computer program.

Optionally, the computer-readable storage medium can be applied to the network device or base station in the embodiments of the present disclosure, and the computer program causes a computer to perform the corresponding processes which are implemented by the network device or base station in the methods of the embodiments of the present disclosure, which will not be repeated here for the sake of brevity.

Optionally, the computer-readable storage medium can be applied to the mobile terminal/terminal device in the embodiments of the present disclosure, and the computer program causes a computer to perform the corresponding processes which are implemented by the mobile terminal/terminal device in the methods of the embodiments of the present disclosure, which will not be repeated here for the sake of brevity.

An embodiment of the present disclosure also provides a computer program product including computer program instructions.

Optionally, the computer program product can be applied to the network device or base station in the embodiments of the present disclosure, and the computer program instructions cause a computer to perform the corresponding processes implemented by the network device or base station in the methods according to the embodiments of the present disclosure, which will not be repeated here for the sake of brevity.

Optionally, the computer program product can be applied to the mobile terminal/terminal device in the embodiments of the present disclosure, and the computer program instructions cause a computer to perform the corresponding processes which are implemented by the mobile terminal/terminal device in the methods of the embodiments of the present disclosure, which will not be repeated here for the sake of brevity.

An embodiment of the present disclosure also provides a computer program.

Optionally, the computer program can be applied to the network device or base station in the embodiments of the present disclosure, and when running on a computer, the computer program causes the computer to perform the corresponding process implemented by the network device or base station in the methods according to the embodiments of the present disclosure, which will not be repeated here for the sake of brevity.

Optionally, the computer program can be applied to the mobile terminal/terminal device in the embodiments of the present disclosure, and when running on a computer, the computer program causes the computer to perform the corresponding processes implemented by the mobile terminal/terminal device in the methods of the embodiments of the present disclosure, which will not be repeated here for the sake of brevity.

With the technical solutions of the present disclosure, a HARQ process can be selected when a CG resource corresponds to multiple available HARQ processes. Further, the HARQ process selection rule may include at least one of the following: performing selection according to a HARQ process priority, performing selection according to a priority of a resource corresponding to the HARQ process, performing selection according to a priority of a LCH in a MAC PDU corresponding to the HARQ process, performing selection according to QoS requirement of data corresponding to the HARQ process, performing selection according to a data type corresponding to the HARQ process, and performing selection according to a HARQ process number. In this way, transmission of data corresponding to the HARQ process with a high priority, data corresponding to the resource with a high priority, data corresponding to the LCH with a high priority, or data with high QoS requirements can be prioritized, or transmission of retransmitted data can be prioritized, or transmission of data corresponding to the HARQ process number pre-configured by the network device or pre-defined can be prioritized, etc., so as to ensure timely transmission of the data.

Those of ordinary skill in the art can recognize that the exemplary units and algorithms described in connection with the embodiments disclosed herein can be implemented in electronic hardware or a combination of computer software and the electronic hardware. Whether these functions are implemented in hardware or in software depends on the specific applications of the technical solutions and design constraints. Various methods can be used by professional technicians to implement the described functions for each specific application, and such implementations should not be considered as going beyond the scope of the present disclosure.

Those skilled in the art can clearly understand that for convenience and conciseness of the description, for the specific operating process of the systems, devices and units described above, reference can be made to corresponding processes in the foregoing method embodiments, which will not be repeated here.

It should be understood that the systems, devices, and methods disclosed in several embodiments of the present disclosure can be implemented in other manners. For example, the device embodiments described above are merely illustrative. For example, the division of the units is only a logical function division, and in actual implementations, there can be other division manners. For example, a plurality of units or components can be combined or integrated into another system, or some features can be ignored or not implemented. In addition, the coupling or direct coupling or communication connection shown or discussed herein can also be indirect coupling or communication connection through some interfaces, devices or units, and can be in electrical, mechanical or other forms.

The units described as separate components may be or may not be physically separated, and the components shown as units may be or may not be physical units, that is, they may be located in one place or may be distributed over multiple network units. Some or all of the units can be selected to achieve the objectives of the solutions of the embodiments according to actual requirements.

In addition, the functional units in the embodiments of the present disclosure can be integrated into one processing unit, or each of the units can individually exist physically, or two or more of the units can be integrated into one unit.

If implemented in the form of software functional units and sold or used as an independent product, the functions can be stored in a computer-readable storage medium. With such understanding, the technical solution of the present disclosure essentially, a part thereof that contributes to the prior art, or a part of the technical solution can be embodied in the form of a software product, and the computer software product is stored in a storage medium and includes instructions which cause a computer device (which may be a personal computer, a server, a network device or the like) to perform all or part of the methods described in the embodiments of the present disclosure. The foregoing storage medium includes various medium such as a USB drive, a removable hard disk, a ROM, a RAM, a magnetic disk or an optical disc that can store program codes.

Those described above are only specific implementations of the present disclosure, and the protection scope of the present disclosure is not limited thereto. Any alteration or replacement readily devised by a person skilled in the art within the technical scope disclosed in the present disclosure shall fall within the scope of the present disclosure. Therefore, the protection scope of the present disclosure shall be subject to the protection scope of the claims.

What is claimed is:

1. A wireless communication method, characterized in comprising:

selecting, by a terminal device according to a Hybrid Autonomous Repeat reQuest, HARQ, process selection rule, a first HARQ process from multiple HARQ processes corresponding to a Configured Grant, CG, resource; and transmitting, by the terminal device, data on the first HARQ process through the CG resource, wherein the HARQ process selection rule comprises performing selection according to a priority of the HARQ process, wherein the multiple HARQ processes have different priorities, and the terminal device preferentially selects the HARQ process with the highest priority, wherein the selecting, by the terminal device according to the HARQ process selection, the first HARQ process from the multiple HARQ processes corresponding to the CG resource comprises:

selecting, by the terminal device according to the HARQ process selection rule, the first HARQ process from the multiple HARQ processes corresponding to the CG resource, if a first condition is met, and wherein the first condition comprises that the terminal device receives first indication information, and the first indication information is used to indicate to select the HARQ process according to the HARQ process selection rule.

2. The method according to claim 1, wherein the HARQ process selection rule further comprises at least one of the following:

performing selection according to a priority of a resource corresponding to the HARQ process;

performing selection according to a priority of a Logical Channel, LCH, in a Media Access Control, MAC, Protocol Data Unit, PDU, corresponding to the HARQ process;

performing selection according to Quality of Service, QoS, requirements of data corresponding to the HARQ process;

performing selection according to a data type corresponding to the HARQ process; and performing selection according to a HARQ process number.

3. The method according to claim 1, wherein the first condition further comprises at least one of the following:

the terminal device is a terminal device of R17 or later versions;

the terminal device is a terminal device that supports a specific service;

the terminal device accesses New Radio in Unlicensed spectrum, NRU, for a specific service; and the terminal device has a capability of selecting the HARQ process according to the HARQ process selection rule.

4. The method according to claim 1, characterized in that, the first indication information is indication information for an initial transmission data type, or the first indication information is indication information for a retransmission data type, or the first indication information is indication information for any data type.

5. The method according to claim 4, wherein the HARQ process selection rules indicated by the first indication information for the initial transmission data type, the retransmission data type and any data type are completely the same or not completely the same.

6. The method according to claim 1, wherein the first indication information is carried in configuration information of the CG resource.

7. The method according to claim 1, further comprising:

obtaining, by the terminal device, at least one of the following information:

priorities of the multiple HARQ processes;

priorities of resources corresponding to the multiple HARQ processes;

priorities of LCHs in MAC PDUs corresponding to the multiple HARQ processes;

QOS requirements for data corresponding to the multiple HARQ processes;

data types corresponding to the multiple HARQ processes; and

HARQ process numbers corresponding to the multiple HARQ processes.

8. A terminal device, characterized in comprising:

a transceiver;

a processor; and a memory for storing a computer program, wherein the processor is configured to select a first HARQ process from multiple HARQ processes corresponding to a CG resource according to a HARQ process selection rule; and wherein the transceiver is configured to transmit data on the first HARQ process through the CG resource, wherein the HARQ process selection rule comprises performing selection according to a priority of the HARQ process, wherein the multiple HARQ processes have different priorities, and the terminal device preferentially selects the HARQ process with the highest priority, wherein the processor is configured to:

select the first HARQ process from the multiple HARQ processes corresponding to the CG resource according to the HARQ process selection rule, if a first condition is met, and wherein the first condition comprises that the terminal device receives first indication information, and the first indication information is used to indicate to select the HARQ process according to the HARQ process selection rule.

9. The terminal device according to claim 8, wherein the HARQ process selection rule further comprises at least one of the following:

performing selection according to a priority of a resource corresponding to the HARQ process;

performing selection according to a priority of a LCH in a MAC PDU corresponding to the HARQ process;

performing selection according to QoS requirements of data corresponding to the HARQ process;

performing selection according to a data type corresponding to the HARQ process; and performing selection according to a HARQ process number.

10. The terminal device according to claim 8, wherein the first condition further comprises at least one of the following:

the terminal device is a terminal device of R17 or later versions;

the terminal device is a terminal device that supports a specific service;

the terminal device accesses NRU for a specific service; and the terminal device has a capability of selecting the HARQ process according to the HARQ process selection rule.

11. The terminal device according to claim 8, characterized in that, the first indication information is indication information for an initial transmission data type, or the first indication information is indication information for a retransmission data type, or the first indication information is indication information for any data type.

12. A network device, characterized in comprising:

a transceiver;

a processor; and a memory for storing a computer program, wherein the transceiver is configured to receive data on a first HARQ process transmitted by a terminal device through a CG resource;

wherein the first HARQ process is a HARQ process selected by the terminal device from multiple HARQ processes corresponding to the CG resource according to a HARQ process selection rule, wherein the HARQ process selection rule comprises performing selection according to a priority of the HARQ process, wherein the multiple HARQ processes have different priorities, and the HARQ process with the highest priority is preferentially selected by the terminal device, wherein the transceiver is further configured to:

send first indication information to the terminal device, and wherein the first indication information is used to indicate to select the HARQ process according to the HARQ process selection rule.

13. The network device according to claim 12, wherein the HARQ process selection rule further comprises at least one of the following:

performing selection according to a priority of a resource corresponding to the HARQ process;

performing selection according to a priority of a LCH in a MAC PDU corresponding to the HARQ process;

performing selection according to QoS requirements of data corresponding to the HARQ process;

performing selection according to a data type corresponding to the HARQ process; and performing selection according to a HARQ process number.

14. The network device according to claim 12, wherein:

the first indication information is indication information for an initial transmission data type, or the first indication information is indication information for a retransmission data type, or the first indication information is indication information for any data type.

15. The network device according to claim 14, wherein the HARQ process selection rules indicated by the first indication information for the initial transmission data type, the retransmission data type and any data type are completely the same or not completely the same.

16. The network device according to claim 12, wherein the first indication information is carried in configuration information of the CG resource.

17. The network device according to claim 12, wherein the communication unit is further configured to send at least one of the following information to the terminal device:

priorities of the multiple HARQ processes;

priorities of resources corresponding to the multiple HARQ processes;

priorities of LCHs in MAC PDUs corresponding to the multiple HARQ processes;

QOS requirements for data corresponding to the multiple HARQ processes;

data types corresponding to the multiple HARQ processes; and

HARQ process numbers corresponding to the multiple HARQ processes.

* * * * *